(12) United States Patent
Gray

(10) Patent No.: US 6,378,142 B1
(45) Date of Patent: Apr. 30, 2002

(54) FOLDABLE PRIVACY SCREEN AND PORTABLE TOILET COMBINATION

(76) Inventor: Jean E. Gray, 641 Meade Rd., Colfax, LA (US) 71417

(*) Notice: Subject to any disclaimer, the term of this patent is extended or adjusted under 35 U.S.C. 154(b) by 0 days.

(21) Appl. No.: 09/736,482

(22) Filed: Dec. 13, 2000

(51) Int. Cl.[7] ............................................. A47K 11/02
(52) U.S. Cl. ............................................. 4/449; 4/460
(58) Field of Search .......................... 4/449, 460, 484, 4/599; 135/119, 121, 143

(56) References Cited

U.S. PATENT DOCUMENTS

| | | | |
|---|---|---|---|
| 1,575,131 A | * 3/1926 | Schumacher | .................. 4/460 |
| 3,203,007 A | * 8/1965 | Olson | ............................ 4/484 |
| 3,600,719 A | 8/1971 | Karr | |
| 4,197,681 A | * 4/1980 | Holcombe | .............. 135/119 X |
| 4,751,753 A | 6/1988 | Sargent et al. | |
| 4,926,508 A | 5/1990 | Sargent et al. | |
| 5,251,342 A | 10/1993 | Sansom et al. | |
| 5,544,369 A | * 8/1996 | Roberts | ......................... 4/599 |
| 5,671,487 A | 9/1997 | Chen | |
| 5,682,623 A | 11/1997 | Fenoglio | |
| 5,742,956 A | 4/1998 | Tarver | |
| 5,862,540 A | 1/1999 | Chuan | |
| 5,920,927 A | * 7/1999 | Thomas | ..................... 4/449 X |
| 5,974,597 A | 11/1999 | Conwell | |
| 6,023,792 A | 2/2000 | Croucher et al. | |

* cited by examiner

Primary Examiner—Charles E. Phillips
(74) Attorney, Agent, or Firm—John D. Gugliotta

(57) ABSTRACT

A portable, private toilet is provided having a frame type covered in canvas around three sides of a folding frame supporting a toilet seat. A disposable plastic bag is used under the toilet seat, thus allowing easy cleanup after bathroom duties. The frame is held shut by the use of hook and loop fasteners such as Velcro®. The frame folds flat and is provided with a handle for ease of carrying, storage and transport.

12 Claims, 3 Drawing Sheets

FOLDABLE PRIVACY SCREEN AND PORTABLE TOILET COMBINATION

RELATED APPLICATIONS

The present invention was first described in Disclosure Document Number 477,228 filed on Jul. 21, 2000. There are no previously filed, nor currently any co-pending applications, anywhere in the world.

BACKGROUND OF THE INVENTION

1. Field of the Invention

The present invention relates generally to receptacle type dry closets with seats and the like and, more particularly, to a collapsible tubular structure used to support and shield the portable toilet system

2. Description of the Related Art

It has often been said that a person is so busy, they don't have time to go to the bathroom. While this may or may not be true, the fact that a bathroom is not always handy is true. While a person is traveling, camping, on a boat, at a park, an outdoor event or wherever, bathroom facilities are usually limited. If they do exist, they are often crowded, dirty and unsanitary. A person can go the bathroom just about anywhere provided there is privacy. Another need for privacy is at construction sites or temporary emergency scenes where there is not often time to set up "porta-potties" or the like. A person may need privacy for other means as well such as changing clothes, nursing a baby, taking medication or similar circumstances. Again, privacy is often lacking in public places or outdoor places for these activities.

Numerous attempts have been made to correct for the foregoing problems. A search of the prior art did not disclose any patents that read directly on the claims of the instant invention; however, the following references were considered related.

The following patents disclose a portable collapsible toilet: U.S. Pat. No. 5,682,623 issued in the name of Fenoglio; and U.S. Pat. No. 3,600,719 issued in the name of Karr.

The following patents describe a portable toilet enclosure: U.S. Pat. No. 5,251,342 issued in the name of Sansom et al.; and U.S. Pat. No. 4,751,753 issued in the name of Sargent et al.

U.S. Pat. No. 6,023,792 issued in the name of Croucher et al. discloses a portable toilet for attachment to a vehicle trailer hitch.

U.S. Pat. No. 5,974,597 issued in the name of Conwell describes a portable covered toilet in a convenient packaged unit.

U.S. Pat. No. 5,862,540 issued in the name of Chuan discloses a portable kitchen, toilet, and shower unit.

U.S. Pat. No. 5,742,956 issued in the name of Tarver describes a modular bathroom unit.

U.S. Pat. No. 5,671,487 issued in the name of Chen discloses a portable and mobile toilet with case.

U.S. Pat. No. 4,926,508 issued in the name of Sargent et al. describes a portable toilet with a battery-operated flush assembly.

Of considerable relevance is U.S. Pat. No. 4,751,753 issued in the name of Sargent et al. and U.S. Pat. No. 5,682,623 issued in the name of Fenoglio. However, there remains a need for providing an apparatus and method which can provide privacy in a portable fashion while providing sufficient structural support when in use.

SUMMARY OF THE INVENTION

It is therefore an object of the present invention to provide an improved portable privacy screen.

It is a feature of the present invention to provide an improved portable privacy screen and portable toilet combination.

Briefly described according to one embodiment of the present invention, a portable, private toilet is provided. For use while on a boat, while camping, during extended car travel or similar situations to provide privacy for the purposes of bathroom duties, changing clothes or the like, a frame type structure is provided covered in canvas provides four sides around a folding frame supporting a toilet seat. A disposable plastic bag is used under the toilet seat, thus allowing easy cleanup after bathroom duties. The frame is held shut by the use of hook and loop fasteners such as Velcro®. The invention folds flat and is provided with a handle for ease of carrying, storage and transport.

The use of the present invention will provide users the privacy they desire no matter the location or time in a quick, effective, and clean package.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
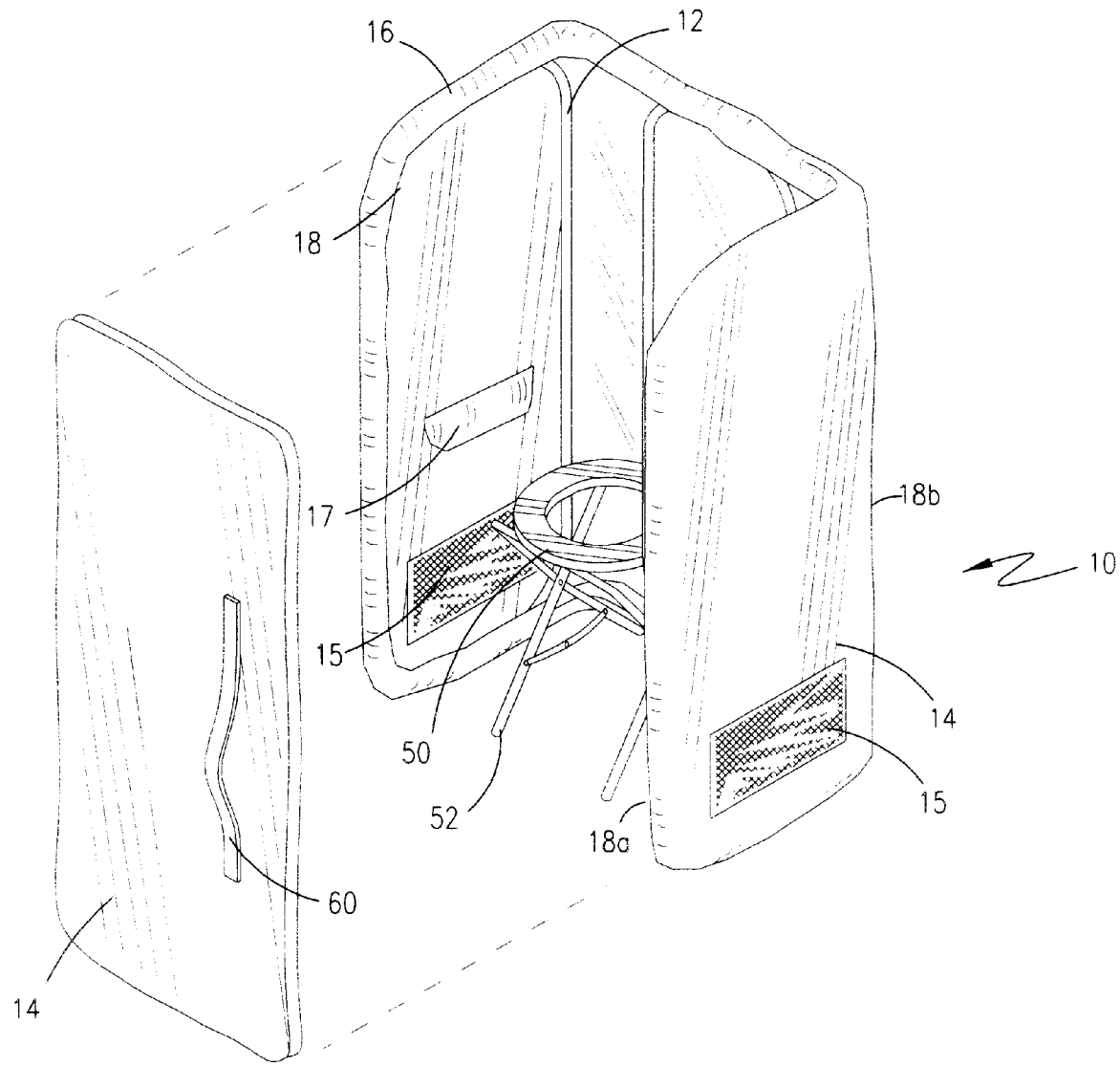
FIG. 1 is a perspective view of a foldable privacy screen and portable toilet combination according to the preferred embodiment.
Figure 4:
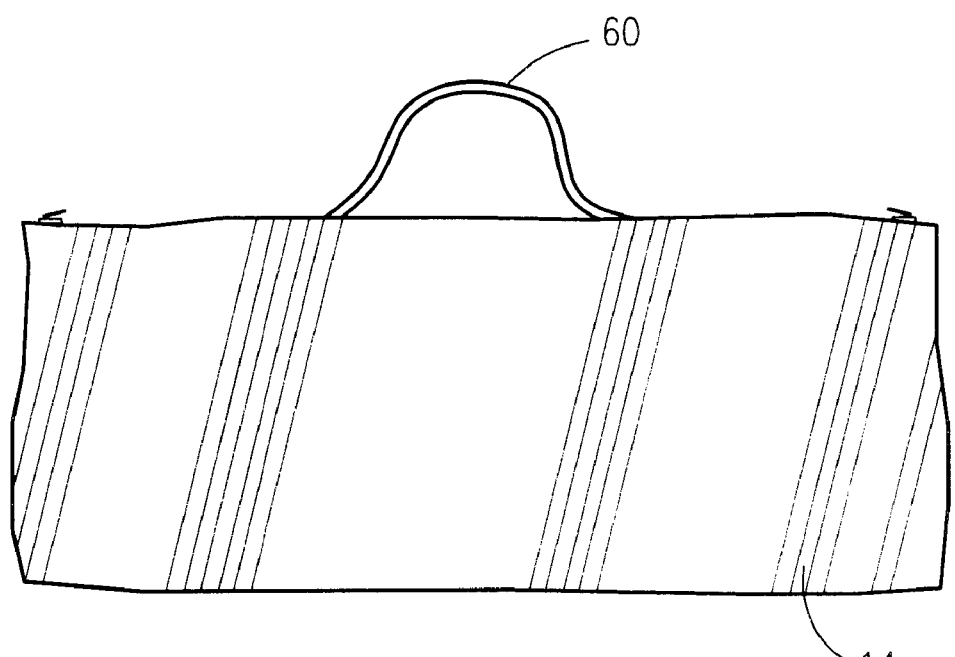
FIG. 4 is a side elevational view of the privacy screen and portable toilet combination shown in a folded, self carrying bag assembly.

Referring now to FIG. 1, a foldable privacy screen and portable toilet combination 10 is shown, according to the present invention, including a partition frame 12 supporting a screen cover 14. The screen cover 14 forms a generally rectangular planar surface having a cover attachment seam 16 circumscribing its perimeter. The cover attachment seam 16 is designed to envelop tubular perimeter frame poles (as described below) and secure to a cover seam attachment means 18. According to the preferred embodiment, the cover seam attachment means 18 comprise a series of linearly aligned hook fastener elements lining one side of the seam 16 opposite to a series of linearly aligned loop fastener elements lining the opposite side of the seam 16 for removably secure the seam 16 to the frame 12. It is also envisioned that additionally available attachment means, such as snaps, buttons, slide fasteners, and the like could provide an equivalent means for perform a similar attachment function. Further, the screen cover 14 has an outer planar surface opposite an inner planar surface. The outer planar surface 14a can support an aesthetic design, such as a conventional camouflage pattern, or any other aesthetic design for fashion or functional intention. A vent orifice 15 covered with a breathable, mesh material is formed on either side of the outer planar surface such as to allow for fluid communication of air about the screen 10. Also, on the inside surface a pair of receiving pouches 17 are supported in order to provide storage of sundries used with the device. Further, a first slide fastener element 18a and a mating, second slide fastener element 18b are parallelly aligned along the outer planar surface 14a such as to facilitate the forming of a folded, self carrying bag assembly as will be better described in conjunction with FIG. 4, below.

Figure 2:
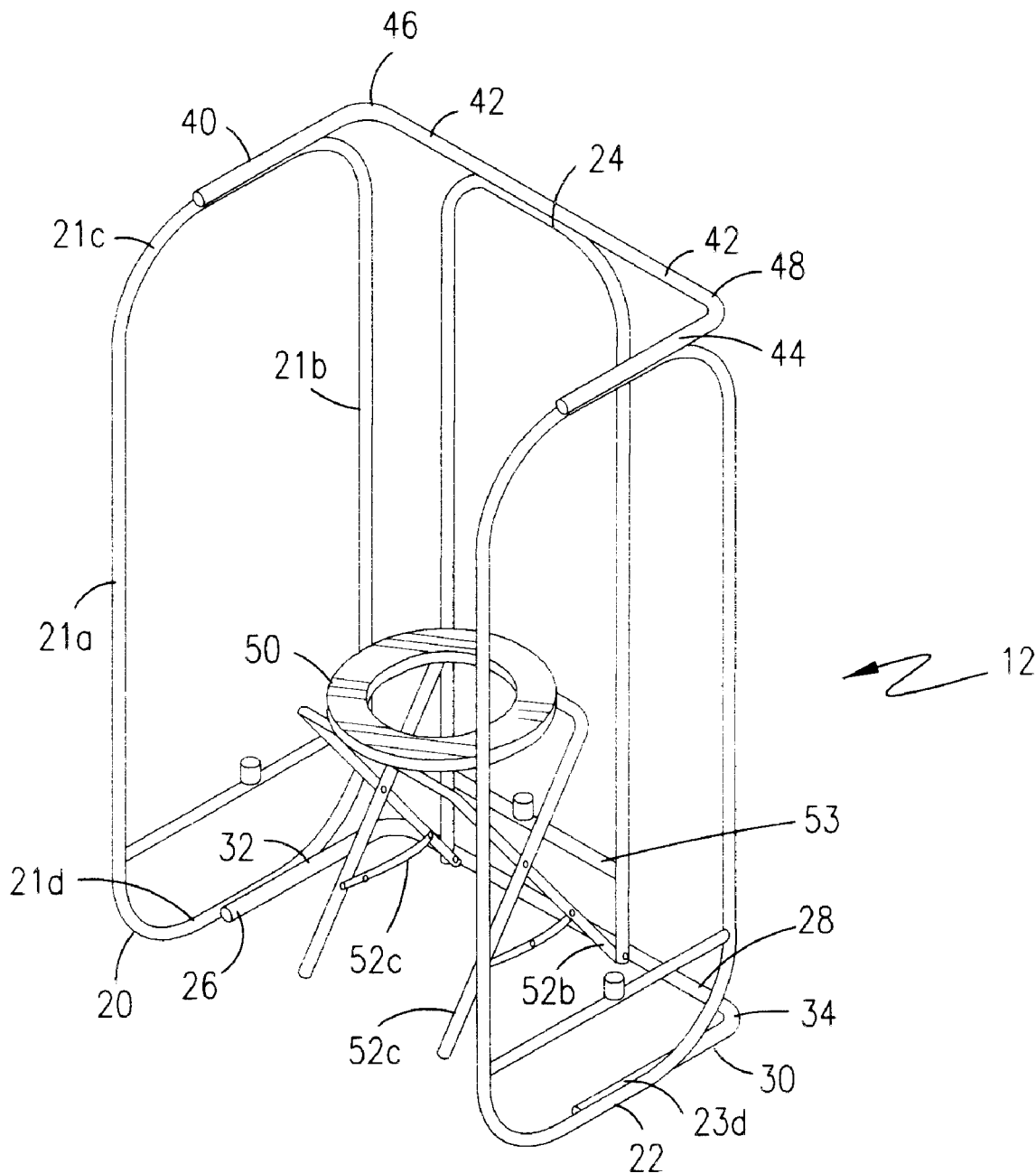
FIG. 2 is a perspective view of the support frame element for use therewith.

Referring to FIG. 2, the partition frame 12 is shown in greater detail. Three main frame elements form the structural portion of the partition frame 12, each having an elongated, rounded rectangular configuration. A first side element frame 20 is mounted opposite a second side element frame 22. Each side element frame 20, 22 surround a rear frame 24. Each frame element 20, 22 is identically sized and shaped. As an example, as shown in reference to the first side element frame 20, a first vertical frame element 21a is formed as a linearly elongated tubular member parallel to a second vertical frame element 21b, and are connected together at the top by a first horizontal frame element 21c and at the bottom by a second horizontal frame element 21d. Each frame element 20, 22 is similarly formed using linearly elongated tubular members formed continuously into a vertically elongated, rounded rectangle having identical size and shape. Frame element 24 is similarly sized and shaped, but having a squared bottom element.

Along the lower surface of the partition frame 12 is a base support. A first frame base support 26 is affixed to the second horizontal frame element 21d. Similarly, a rear frame base support 28 is affixed to a second horizontal frame element 25d of the rear frame 24, and second frame base support 30 is affixed to a second horizontal frame element 23d of the second side element frame 22. The first frame base support 26 and second frame base support 30 are each hinged in an articulating fashion to the rear frame base support 28 by a first lower articulating hinges 32 and second lower articulating hinge 34, respectively.

Along the upper surface of the partition frame 12 is a frame crest support. A first frame crest support 40 is affixed to the first horizontal frame element 21c. Similarly, a rear frame crest support 42 is affixed to a first horizontal frame element 25c of the rear frame 24, and second frame crest support 44 is affixed to a first horizontal frame element 23c of the second side element frame 22. The first frame crest support 40 and second frame crest support 44 are each hinged in an articulating fashion to the rear frame crest support 42 by a first upper articulating hinges 46 and second upper articulating hinge 48, respectively.

The final feature of the partition frame 12 is a portable toilet seat 50 that is supported at a horizontal plane by a seat support frame 52. The seat support frame 52 is formed of a first seat support 52a cross connected near its center by a second seat support 52b linked securely by a safety lock 52c. The seat 50 is pivotally affixed to the top of the second seat support 52b such as to allow the seat 50 to pivot upwards and flat for storage. The first seat support 52a is pivotally affixed to the bottom of the first seat support 52a such as to allow the seat support frame 52 to collapse vertically flush with the rear frame 24. Additionally, a ballast securing means 53, shown herein as a molded plastic container capable of retaining sand or water, are capable of extending between frame elements for providing additional weight to the bottom of the unit for stability, when needed.

Figure 3:
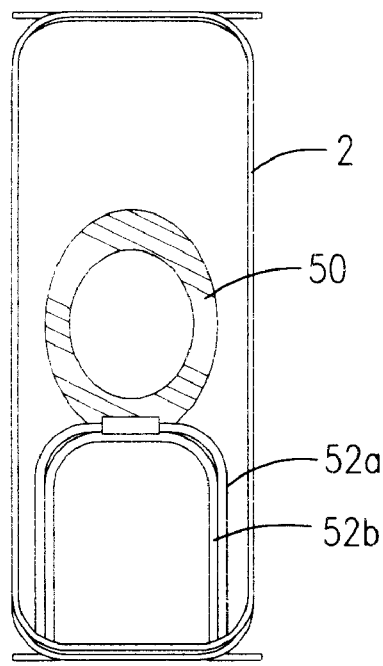
FIG. 3 is a collapsed, folded front elevational view thereof.

FIG. 3 shows the foldable privacy screen and portable toilet combination according to the preferred embodiment in a collapsed, folded condition. As shown, the toilet seat assembly (50, 52) is folded vertically flush with the rear frame, and the first side element frame 20 and second side element frame 22 are pivoted inward on the articulating hinges such as to form a collapsed, flat generally rectangular and compressed frame. As shown in conjunction with FIG. 4, this collapsed frame can then be wrapped by the screen cover 14 in a manner such as to allow alignment of the first slide fastener 18a with the second slide fastener 18b, allowing the slide fasteners to be zippered together and thereby forming an integral carrying container. A carrying strap 60 thereby allows easy portability of the screen and toilet combination 10.

2. Operation of the Preferred Embodiment

In operation, the present invention is transported to a remote location, where the frame 12 is expanded into a stable, upright position. The screen cover 14 is attached, and the seat 50 secured in a horizontal level. A disposable plastic bag is used under the toilet seat, thus allowing easy cleanup after bathroom duties. Upon removal, the frame is collapsed and held shut by the use of hook and loop fasteners such as Velcro®. The invention folds flat and is provided with a handle for ease of carrying, storage and transport.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A privacy screen and portable toilet combination comprising:
    a partition frame formed of tubular perimeter frame poles;
    a screen cover forming a generally rectangular planar surface having an outer planar surface opposite an inner planar surface and further having a cover attachment seam circumscribing its perimeter, said cover attachment seam designed to envelop said tubular perimeter frame poles;
    attachment means for securing said attachment seam; and
    a toilet seat supported at a horizontal plane by a seat support frame affixed to said partition frame, wherein said seat support frame is formed of a first seat support cross connected near its center by a second seat support linked securely by a safety lock, and having a seat pivotally affixed to the top of the second seat support such as to allow the seat to pivot upwards and flat for storage.

2. The combination of claim 1, wherein said first seat support is pivotally affixed to the bottom of said support frame such as to allow the seat support frame to collapse vertically.

3. The combination of claim 2, wherein said cover seam attachment means comprise a series of linearly aligned hook fastener elements lining one side of the seam opposite to a series of linearly aligned loop fastener elements lining the opposite side of the seam for removably secure the seam to the frame.

4. The combination of claim 2, wherein said outer planar surface supports an aesthetic design.

5. The combination of claim 2, wherein said outer planar surface forms a vent orifice covered with a breathable, mesh material on either side of the outer planar surface such as to allow for fluid communication of air about the screen.

6. The combination of claim 2, wherein said inner planar surface supports inside surface a pair of receiving pouches.

7. The combination of claim 2, wherein said partition frame comprises three main frame elements forming a structural portion of said partition frame, each having an elongated rectangular configuration.

8. The combination of claim 7, wherein said main frame element include a first side element frame mounted opposite a second side element frame, each side element frame surrounding a rear frame, each frame element being having the same sized overall outer perimeter.

9. The combination of claim 8, wherein said rear frame, said first side element frame and said second side element frame are pivoted inward on the articulating hinges such as to form a collapsed, flat generally rectangular and compressed frame.

10. The combination of claim 9, wherein said collapsed frame can be wrapped by said screen cover in a manner such as to allow alignment of a first slide fastener with a second slide fastener, allowing the slide fasteners to be zippered together and thereby forming an integral carrying container.

11. The combination of claim 2, further comprising ballast securing means capable of straddling the lower horizontal frame elements for providing additional weight to the bottom of the unit for stability.

12. The combination of claim 11, wherein said ballast securing means comprise molded plastic container.

\* \* \* \* \*